Figure 1:
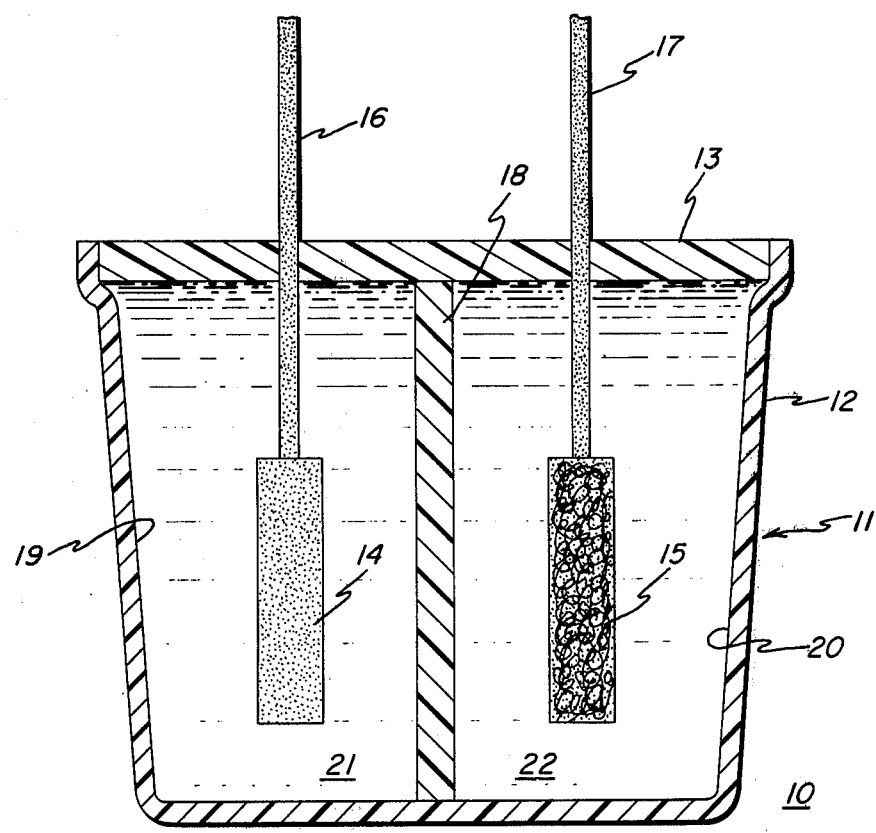

United States Patent [19]

Will

[11] 4,074,028
[45] Feb. 14, 1978

[54] DENDRITE-INHIBITING ELECTROLYTIC SOLUTION AND RECHARGEABLE AQUEOUS ZINC-HALOGEN CELL CONTAINING THE SOLUTION

[75] Inventor: Fritz G. Will, Scotia, N.Y.

[73] Assignee: General Electric Company, Schenectady, N.Y.

[21] Appl. No.: 794,974

[22] Filed: May 9, 1977

[51] Int. Cl.$^2$ .......................................... H01M 10/26
[52] U.S. Cl. .................................. 429/105; 429/198; 429/199
[58] Field of Search ............... 429/198, 199, 105, 207, 429/229, 250

[56] References Cited

U.S. PATENT DOCUMENTS

| | | | |
|---|---|---|---|
| 3,653,965 | 4/1972 | Lee ........................................ | 429/198 |
| 3,928,070 | 12/1975 | Gunther ............................ | 429/198 X |
| 3,930,882 | 1/1976 | Ohsawa et al. ....................... | 429/207 |
| 4,040,916 | 8/1977 | Will et al. ........................... | 429/198 X |

*Primary Examiner*—Anthony Skapars
*Attorney, Agent, or Firm*—Paul R. Webb, II; Joseph T. Cohen; Jerome C. Squillaro

[57] ABSTRACT

A dendrite-inhibiting electrolytic solution and rechargeable aqueous zinc-halogen cell containing the solution are described. The electrolytic solution contains a zinc compound, a non-ionic surfactant additive of oxaalkyl or polyoxaalkyl perfluoroalkane sulfonamide in an amount of from 0.001 to 10 weight percent of the solution, and an organic solubilizer in an amount from 5 to 50 weight percent of the solution. The cell includes a casing, a pair of spaced apart porous electrode substrates in the casing, an ion exchange membrane separator between the electrode substrates defining a positive and a negative electrode compartment, an electrolytic solution containing a zinc compound in the positive compartment, and the above electrolytic solution containing the additive and the solubilizer in the negative zinc electrode compartment.

10 Claims, 2 Drawing Figures

DENDRITE-INHIBITING ELECTROLYTIC SOLUTION AND RECHARGEABLE AQUEOUS ZINC-HALOGEN CELL CONTAINING THE SOLUTION

This invention relates to a electrolytic solution and a rechargeable aqueous zinc-halogen cell and more particularly, to such a dendrite-inhibiting solution and to such a cell containing the solution in the negative zinc electrode compartment.

During the electrodeposition of zinc, as it applies to the charging of cells with zinc electrodes and to the electroplating of zinc, metallic dendrites usually form. The dendrite problem is especially severe at high current densities and long deposition times. During cell cycling, dendrites cannot be discharged at reasonable current densities and, eventually, they grow through separator materials, causing cell shorting. This problem has thus far retarded commercialization of rechargeable zinc-halogen cells.

Abundant use is being made of additives, both organic and inorganic in the electroplating industry to prevent dendrite growth. Additives have been used in cells to suppress dendrites; but these additives lack long-term stability, and soon loose their effectiveness during charge/discharge cycling. They are either reduced on the zinc electrode or oxidized chemically or electrochemically. A great number of these known additives have been tested and their lack of stability ascertained when used over longer periods of time.

In copending patent application Ser. No. 715,226 filed Aug. 18, 1976, now U.S. Pat. No. 4,040,916 there is disclosed and claimed a method for forming a non-dendritic zinc layer which includes providing a deposition solution containing a zinc compound and from 0.001 to 10 weight percent of a non-ionic surfactant additive of oxaalkyl or polyoxaalkyl perfluoroalkane sulfonamide, positioning a pair of spaced apart electrodes within the solution, applying an electric current to the electrodes, and depositing a non-dendritic zinc layer on the negative electrode. There is also disclosed and claimed a dendrite-inhibiting deposition solution containing the dendrite-inhibiting non-ionic surfactant additive that is particularly stable both to reduction and oxidation, and furthermore, is effective in small amounts. This copending patent application is assigned to the same assignee as the present application.

When applying the dendrite-inhibiting deposition solution in zinc-halogen cells, I found certain conditions under which the solubility of the dendrite-inhibiting additive was less than desired, resulting in less effective dendrite control. Specifically, I found that the solubility was lower than desired in dilute aqueous electrolyte solutions or when bromine was allowed to contact the dendrite-inhibiting additive. Such contact will ensue as a result of small quantities of bromine diffusing from the bromine electrode compartment through the membrane separator into the zinc electrode compartment.

The present invention is directed to a dendrite-inhibiting electrolytic solution and to an improved rechargeable aqueous zinc-halogen cell containing the solution. The dendrite-inhibiting electrolytic solution contains the deposition solution of the above copending patent application, and an organic solubilizer to raise the solubility of the dendrite-inhibiting additive.

The primary objects of my invention are to provide a dendrite-inhibiting electrolytic solution containing a dendrite-inhibiting additive and an organic solubilizer and to provide a rechargeable aqueous zinc-halogen cell containing the solution which functions without dendrite or halogen interference.

In accordance with one aspect of my invention, a rechargeable aqueous zinc-halogen cell includes within the negative compartment a dendrite-inhibiting electrolytic solution containing a non-ionic surfactant additive and an organic solubilizer.

Reference is made to U.S. Pat. No. 2,915,554 issued Dec. 1, 1959, under the title of "Non-Ionic Surfactant Derivatives of Perfluoro Alkane-Sulfonamides" for methods of preparation of non-ionic surfactant derivatives. The non-ionic surfactant additives which are utilized in the present invention can be prepared in a similar manner.

Figure 2:
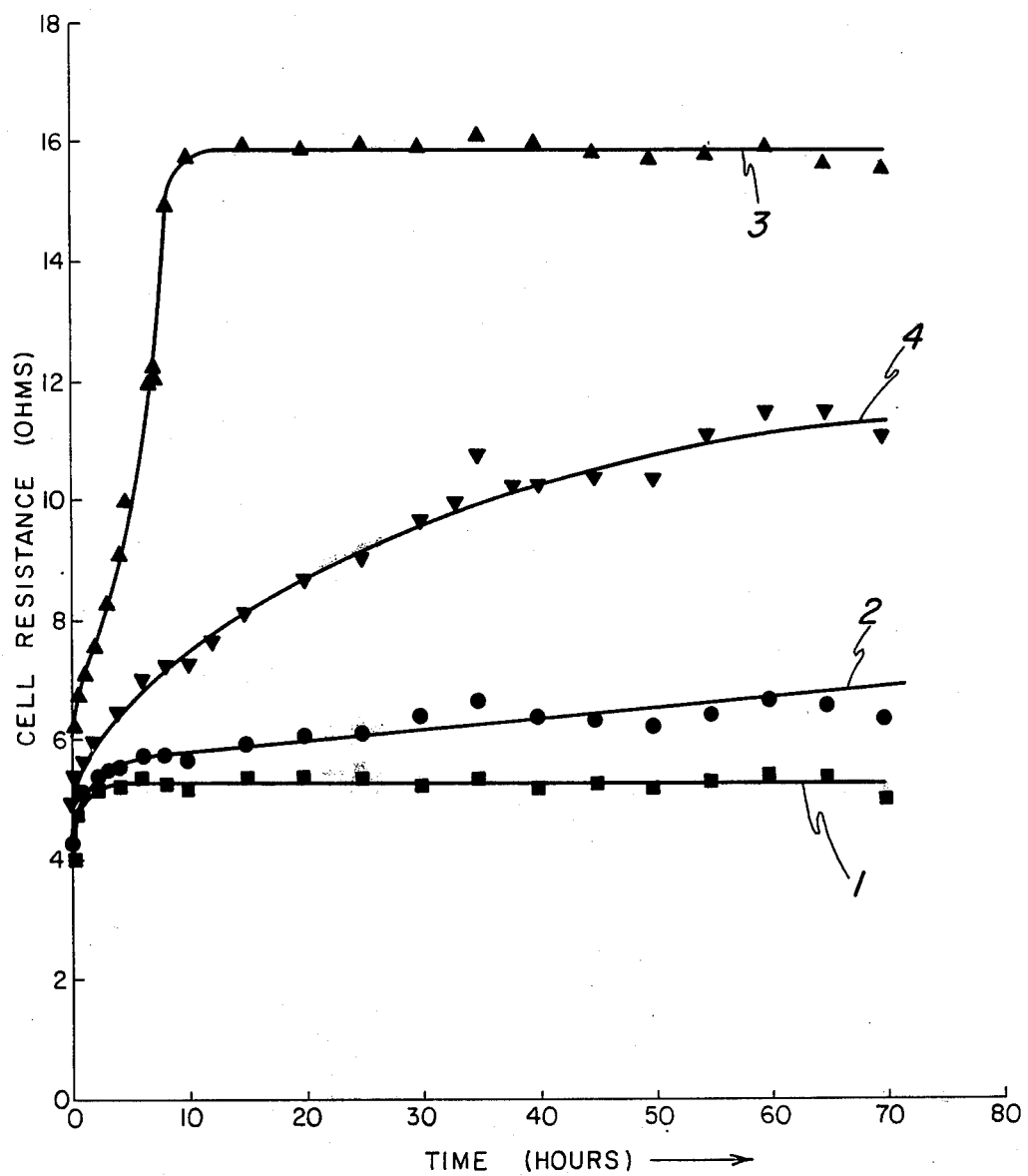

These and various other objects, features and advantages of the invention will be better understood from the following description taken in connection with the accompanying drawing in which:

FIG. 1 is a sectional view of a rechargeable aqueous zinc-halogen cell made in accordance with my invention; and FIG. 2 is a graph plotting cell resistance in ohms against time in hours for four cells, of which one cell was made in accordance with my invention.

In FIG. 1 of the drawing, there is shown generally at 10 a rechargeable aqueous zinc-halogen cell embodying my invention. Cell 10 has a casing 11 which includes a body portion 12 and a cover 13. While casing 11 is shown as a polyolefin plastic or polytetrafloroethylene, other plastic materials can be employed. The casing can also be made of glasses, or metals which include an inner liner of a fluorinated or chlorinated polyolefin plastic or copolymers thereof. Unlined metals, such as tantalum, niobium and molybdenum can also be employed for the casing.

A pair of porous electrode substrates 14 and 15 are suspended within casing 11 by carbon rods 16 and 17, respectively. Positive electrode substrate 14 is shown as carbon while negative electrode substrate 15 is made of copper foam. Electrical leads (not shown) are connected to rods 16 and 17 and to a power source (not shown) or to an apparatus (not shown). An ion exchange membrane separator 18, defines a positive compartment 19 containing electrode 14, and a negative compartment 20 containing electrode 15. The positive compartment 19 is the compartment which will contain bromine in the charged condition of the cell while the negative compartment 20 is the compartment in which zinc is deposited upon its electrode 15. In the positive compartment, the porous substrate can also be made of porous metal of tantalum, niobium, molybdenum or titanium in various forms, such as screens or foams and catalyzed with $RuO_2$ for improved performance. In the negative compartment, porous substrate 15 can also be made of porous carbon or porous metal of titanium, tin or lead in various forms, such as screens or foams.

An aqueous electrolytic solution containing zinc-halide is shown as 21 in positive compartment 19. From 1 to 50 weight percent of the halogen is added to the electrolytic solution. A similar aqueous electrolytic solution containing zinc-halide, a non-ionic surfactant additive and an organic solubilizer made in accordance with my invention is shown as 22 in negative compartment 20. While zinc-halide is generally mentioned above for the dendrite-inhibiting electrolytic solution, the zinc-containing ion for the electrolyte can be selected from various zinc compounds, such as, zinc bromide, zinc iodide, zinc chloride or mixtures thereof. The electrolytic solution will of course contain water but it may also contain one or more other salts. I found that a preferred electrolytic solution contained, on a weight basis, 15.9% $ZnBr_2$, 15.9% KBr, 3.2% $Al_2(SO_4)_3$, 1.6% $H_3BO_3$, and balance water. The ionic surfactant additive comprises on a weight basis 0.001 to 10 percent of the electrolytic solution. The preferred range is 0.1 to 1 percent. The organic solubilizer comprises on a weight basis 5 to 50 weight percent of the electrolytic solution. The percentage of water content of the dendrite-inhibiting electrolytic solution is reduced according to the percent of the additive and solubilizer added thereto.

In FIG. 2 of the drawing, there is shown a graph plotting cell resistance in ohms against time in hours. The plot for a cell of Example X made in accordance with my invention is shown as line 1. Similar plots are shown for three additional cells not made in accordance with my invention which are lines 2, 3, and 4. From this graph, it will be seen that the cell made in accordance with my invention exhibited the lowest cell resistance over a specific period of time.

In above-mentioned copending patent application Ser. No. 715, 226, it is described that certain non-ionic surfactant additives of oxaalkyl and polyoxaalkyl perfluoroalkane sulfonamides were superior to the other above compounds tested to inhibit effectively the growth of dendrites during cycling of zinc electrodes in batteries. In this copending application, the non-ionic surfactant additives of oxaalkyl and polyoxaalkyl perfluoroalkane sulfonamides incorporated into the deposition solution and into the method for forming a non-dendritic zinc layer having the formula:

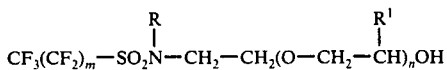

where $m$ is a number from 3 to 15, R is an alkyl radical having from 1 to 10 carbon atoms, R is a member of a group consisting of hydrogen and methyl radical, $n$ is a number for the group from 0 to 30, and the surfactant additive has a molecular weight range of approximately 550 – 1500.

The above class of non-ionic surfactant additives is far more stable towards both reduction and oxidation in rechargeable cells with zinc electrodes than any other of a large number of compounds tested. The above non-ionic surfactant additives were effective while ionic fluorinated surfactants additives were ineffective.

In the method of the subject copending application, a deposition solution is provided containing a zinc compound from which the zinc will be deposited on a metallic or other conducting surface, such as graphite or carbon, and containing a non-ionic surfactant additive having the above formula. In a rechargeable zinc cell, the negative electrode compartment of the cell contains the zinc compounds from which zinc will be deposited on the negative electrode. Such negative electrode may be made of certain metals, such as copper, tin or lead, and also of graphite or carbon. A non-ionic surfactant additive, which has the above formula, is incorporated into the cell negative compartment electrolyte on a weight basic from 0.001 to 10 percent. The preferred range is 0.1 to 1 percent. This electrolytic solution with the specific non-ionic surfactant additive provides the deposition solution of our invention. The preferred negative compartment electrolyte contains on a weight basis 53.40 to 63.399% $H_2$, 15.9% $ZnBr_2$, 15.9% KBr, 3.2% $Al_2(SO_4)_3$ and 1.6% $H_3BO_3$. The ionic surfactant additive comprises on a weight basis 0.001 to 10 percent of the deposition solution.

Among a large number of inhibitors tested, the above additives proved to be the only ones stable over longer periods of time. However, I found the solubility of these effective additives to be lower than desired, that is 0.1 to 1%, in dilute aqueous electrolyte solutions containing more than 70% water. I found that the solubility of the dendrite-inhibiting additive was further lowered when bromine contacted the additive after diffusing through the membrane separator defining the negative and positive electrode compartments. The decreased solubility of the additive was evident from a reduced effectiveness in controlling dendrites and from a progressive increase of the cell resistance with time. I have found that this resistance increase is caused by the interaction of the additive with bromine and precipitation of a reaction product on the ion exchange membrane separating the halogen, such as bromine, and the zinc compartments. As small amounts of $Br_2$ or $Br_3-$ slowly permeate the membrane, into the zinc compartment, the $Br_2$ immediately forms an insoluble complex with the additive which accumulates at or near the membrane surface and causes the resistance increase. The complex with the $Br_2$ has very low water solubility. Once formed, the resistive complex film remains at the membrane surface and continues to grow in thickness as more $Br_2$ diffuses through the membrane. It appears that the complex even penetrates into the membrane since wiping removes only part of the resistive film.

I found that I could form an improved rechargeable zinc-halogen cell by preventing the above resistance increase cause by the permeation of $Br_2$ or $Br_3-$ into the zinc compartment. I found that the addition of an organic solubilizer in an amount from 5 to 50 weight percent of the electrolytic solution only in the negative or zinc compartment solubilizes the complex between the additive and the halogen and generally raises the solubility of the additive in the aqueous electrolyte, especially in dilute electrolyte solutions. Various organic solubilizers are useful as an addition to the electrolytic solution in the zinc compartment. Particularly effective were organic solubilizers selected from the class consisting of butyrolactone, dimethylsulfonamide, propylene carbonate, ethylene carbonate, dimethylformamide and dimethylacetamide.

In accordance with my invention, a dendrite-inhibiting electrolytic solution comprises a solution containing a zinc compound, from 0.001 to 10 weight percent of a non-ionic surfactant additive which has the formula:

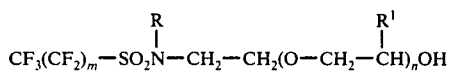

where $m$ is a number from 3 to 15, R is an alkyl radical having from 1 to 10 carbon atoms, $R^1$ is a member of a group consisting of hydrogen and methyl radical, $n$ is a number for the group from 0 to 30, and the surfactant additive has a molecular weight range of approximately 550 –1500; positioning a pair of spaced apart electrodes within the deposition solution, applying an electric current to the electrodes, and depositing a non-dendritic zinc layer on the negative electrode, and an organic solubilizer in an amount from 5 to 50 weight percent of the solution.

In accordance with my invention, a rechargeable aqueous zinc-halogen cell is formed by providing a casing, and positioning a pair of spaced apart porous electrode substrates in the casing. An ion exchange membrane is positioned between the electrode substrates defining a positive and a negative electrode compartment. An electrolytic solution containing a zinc compound fills substantially both compartments. The negative compartment has from 0.001 to 10 weight of the solution of a non-ionic surfactant additive, and an organic solubilizer in an amount from 5 to 50 weight percent of the solution.

Examples of dendrite-inhibiting electrolytic solutions and of rechargeable aqueous zinc-halogen cells made in accordance with my invention are set forth below:

EXAMPLE I

A dendrite-inhibiting electrolytic solution was prepared in a glass beaker. The solution contained an aqueous electrolytic solution containing 57.0% H₂0, 14.0% ZnBr₂, 14.0% KBr, 14.0% CaCl₂, 1.0% of a non-ionic surfactant additive having the formula:

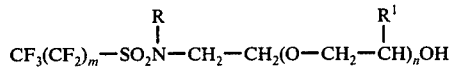

where m is a number from 3 to 15, R is an alkyl radical having from 1 to 10 carbon atoms, R¹ is a member of a group consisting of hydrogen and methyl radical, n is a number for the group from 0 to 30, and the surfactant additive has a molecular weight range of approximately 550 – 1500, and an organic solubilizer of butyrolactone in an amount of 10.0 weight percent of the solution. A chemical analysis of the above non-ionic surfactant additive disclosed the following percentages of carbon, hydrogen, nitrogen, sulfur and fluorine: 39.67% carbon, 5.63% hydrogen, 0.50% nitrogen, 1.70% sulfur, and 36.56% fluorine. The solution was heated to approximately 80° C and stirred for 30 minutes and then allowed to cool. This solution was made in accordance with my invention. A visual examination of the solution and of the beaker disclosed no film on the inner surface of the beaker and no oily globules in the solution thereby showing solubility of the additive.

EXAMPLE II

A dendrite-inhibiting electrolytic solution was prepared in a glass beaker. The solution contained an aqueous electrolytic solution containing 58.0% H₂0, 20.0% ZnBr₂, 10.0% KBr, 10.0% CaCl₂, 2.0% of a non-ionic surfactant additive having the formula:

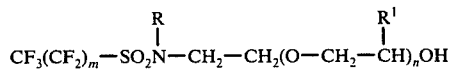

where m is a number from 3 to 15, R is an alkyl radical having from 1 to 10 carbon atoms, R¹ is a member of a group consisting of hydrogen and methyl radical, n is a number for the group from 0 to 30, and the surfactant additive has a molecular weight range of approximately 550 – 1500, and an organic dimethylsulfonamide solubilizer in an amount of 10.0 weight percent of the solution. A chemical analysis of the above non-ionic surfactant additive disclosed the following percentages of carbon, hydrogen, nitrogen, sulfur, and fluorine: 39.67% carbon, 5.63% hydrogen, 0.50% nitrogen, 1.70%sulfur, and 36.56% fluorine. The solution was heated to approximately 80° C and stirred for 30 minutes and then allowed to cool. This solution was made in accordance with my invention. A visual examination of the solution and of the beaker disclosed no film on the inner surface of the beaker and no oily globules in the solution thereby showing solubility of the additive.

EXAMPLE III

A dendrite-inhibiting electrolytic solution was prepared in a glass beaker. The solution contained an aqueous electrolytic solution containing 57.0% H₂0, 14.0% ZnBr₂, 14.0% KBr, 14.0% CaCl₂, 1.0% of a non-ionic surfactant additive having the formula:

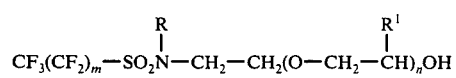

where m is a number from 3 to 15, R is an alkyl radical having from 1 to 10 carbon atoms, R¹ is a member of a group consisting of hydrogen and methyl radical, n is a number for the group from 0 to 30, and the surfactant additive has a molecular weight range of approximately 550 – 1500, and an organic solubilizer of dimethylformamide in an amount of 10.0 weight percent of the solution. A chemical analysis of the above non-ionic surfactant additive disclosed the following percentages of carbon, hydrogen, nitrogen, sulfur, and fluorine: 39.67% carbon, 5.63% hydrogen, 0.50% nitrogen, 1.70% sulfur, and 36.56% fluorine. The solution was heated to approximately 80° C and stirred for 30 minutes and then allowed to cool This solution was made in accordance with my invention. A visual examination of the solution and of the beaker disclosed no film on the inner surface of the beaker and no oily globules in the solution thereby showing solubility of the additive.

EXAMPLE IV

A dendrite-inhibiting electrolytic solution was prepared in a glass beaker. The solution contained an aqueous electrolytic solution containing 57.0% H₂0, 14.0% ZnBr₂, 14.0% KBr, 14.0% CaCl₂, 1.0% of a non-ionic surfactant additive having the formula:

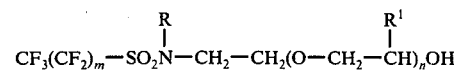

where m is a number from 3 to 15, R is an alkyl radical having from 1 to 10 carbon atoms, R¹ is a member of a group consisting of hydrogen and methyl radical, n is a number for the group from 0 to. 30, and the surfactant additive has a molecular weight range of approximately 550 – 1500, and an organic solubilizer of dimethylacetamide in an amount of 10.0 weight percent of the solution. A chemical analysis of the above non-ionic surfactant additive disclosed the following percentages of carbon, hydrogen, nitrogen, sulfur, and fluorine: 39.67% carbon, 5.63% hydrogen, 0.50% nitrogen, 1.70% sulfur, and 36.56% fluorine. The solution was heated to approximately 80° C and stirred for 30 minutes and then allowed to cool. This solution was made in accordance with my invention. A visual examination of the solution and of the beaker disclosed no film on the inner surface of the beaker and no oily globules in the solution thereby showing solubility of the additive.

EXAMPLE V

A dendrite-inhibiting electrolytic solution was prepared in a glass beaker. The solution contained an aqueous electrolytic solution containing 57.0% H₂O, 14.0% ZnBr₂, 14.0% KBr, 14.0% CaCl₂, 1.0% of a non-ionic surfactant additive having the formula:

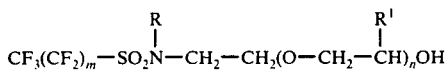

where $m$ is a number from 3 to 15, R is an alkyl radical having from 1 to 10 carbon atoms, $R^1$ is a member of a group consisting of hydrogen and methyl radical, $n$ is a number for the group from 0 to 30, and the surfactant additive has a molecular weight range of approximately 550 –1500, and an organic solubilizer of tetrahydrofuran in an amount of 10.0 weight percent of the solution. A chemical analysis of the above non-ionic surfactant additive disclosed the following percentages of carbon, hydrogen, nitrogen, sulfur, and fluorine: 39.67% carbon, 5.63% hydrogen, 0.50% nitrogen, 1.70% sulfur, and 36.56% fluorine. The solution was heated to approximately 80° C and stirred for 30 minutes and then allowed to cool. This solution was made in accordance with my invention. A visual examinatin of the solution and of the beaker disclosed no film on the inner surface of the beaker and no oily globules in the solution thereby showing solubility of the additive.

EXAMPLE VI

A dendrite-inhibiting electrolytic solution was prepared in a glass broker. The solution contained an aqueous electrolytic solution containing 57.0% H₂O, 14.0% ZnBr₂, 14.0% KBr, 14.0% CaCl₂, 1.0% of a non-ionic surfactant additive having the formula:

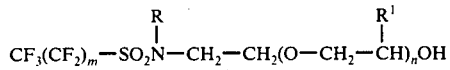

where $m$ is a number from 3 to 15, R is an alkyl radical having from 1 to 10 carbon atoms, $R^1$ is a member of a group consisting of hydrogen and methyl radical, $n$ is a number for the group from 0 to 30, and the surfactant additive has a molecular weight range of approximately 550 – 1500, and an organic solubilizer of sulfolane in an amount of 10.0 weight percent of the solution. A chemical analysis of the above non-ionic surfactant additive disclosed the following percentages of carbon, hydrogen, nitrogen, sulfur and fluorine: 39.67% carbon, 5.63% hydrogen, 0.50% nitrogen, 1.70% sulfur, and 36.56% fluroine. The solution was heated to approximately 80° C and stirred for 30 minutes and then allowed to cool. This solution was made in accordance with my invention. A visual examination of the solution and of the beaker disclosed no film on the inner surface of the beaker and no oily globules in the solution thereby showing solubility of the additive.

EXAMPLE VII

A dendrite-inhibiting electrolytic solution was prepared in a glass beaker. The solution contained an aqueous electrolytic solution containing 57.0% H₂O, 14.0% ZnBr₂, 14.0% KBr, 14.0% CaCl₂, 1.0% of a non-ionic surfactant additive having the formula:

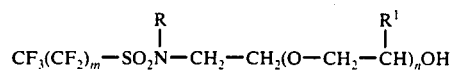

where $m$ is a number from 3 to 15, R is an alkyl radical having from 1 to 10 carbon atoms, $R^1$ is a member of a group consisting of hydrogen and methyl radical, $n$ is a number for the group from 0 to 30, and the surfactant additive has a molecular weight range of approximately 550 – 1500, and an organic solubilizer of ethylene carbonate in an amount of 10.0 weight percent of the solution. A chemical analysis of the above non-ionic surfactant additive disclosed the following percentages of carbon, hydrogen, nitrogen, sulfur and fluorine: 39.67% carbon, 5.63% hydrogen, 0.50% nitrogen, 1.70% sulfur, and 36.56% fluorine. The solution was heated to approximately 80° C and stirred for 30 minutes and then allowed to cool. This solution was made in accordance with my invention. A visual examination of the solution and of the beaker disclosed no film on the inner surface of the beaker and no oily globules in the solution thereby showing solubility of the additive.

EXAMPLE VIII

A dendrite-inhibiting electrolytic solution was prepared in a glass beaker. The solution contained an aqueous electrolytic solution containing 57.0% H₂O, 14.0% ZnBr₂, 14.0% KBr, 14.0% CaCl₂ 1.0% of a non-ionic surfactant additive having the formula:

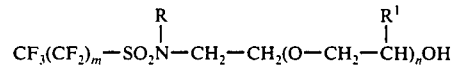

where $m$ is a number from 3 to 15, R is an alkyl radical having from 1 to 10 carbon atoms, $R^1$ is a member of a group consisting of hydrogen and methyl radical, $n$ is a number for the group from 0 to 30, and the surfactant additive has a molecular weight range of approximately 550 – 1500, and an organic solubilizer of propylene carbonate in an amount of 10.0 weight percent of the solution. A chemical analysis of the above non-ionic surfactant additive disclosed the following percentages of carbon, hydrogen, nitrogen, sulfur and fluorine: 39.67% carbon, 5.63% hydrogen, 0.50% nitrogen, 1.70% sulfur, and 36.56% fluorine. The solution was heated to approximately 80° C and stirred for 30 minutes and then allowed to cool. This solution was made in accordance with my invention. A visual examination of the solution and of the beaker disclosed no film on the inner surface of the beaker and no oily globules in the solution thereby showing solubility of the additive.

EXAMPLE IX

A zinc-bromine cell was assembled including a glass casing and a glass cover. A positive carbon electrode substrate and a negative carbon electrode substrate were inserted into the casing and spaced apart. A cation exchange separator of 11/1000 inch thickness was inserted into the casing between the electrodes to define a positive compartment and a negative compartment. The negative compartment was filled substantially with an aqueous electrolytic solution of the type of Example I containing 57.0% H₂O, 14.0% ZnBr₂, 14.0% KBr, 14.0% CaCl$_2$, 1.0% of a non-ionic surfactant additive having the formula:

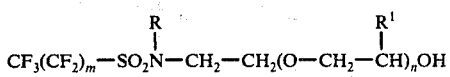

where $m$ is a number from 3 to 15, R is an alkyl radical having from 1 to 10 carbon atoms, R$^1$ is a member of a group consisting of hydrogen and methyl radical, $n$ is a number for the group from 0 to 30, and the surfactant additive has a molecular weight range of approximately 550 – 1500, and an organic solvent complex solubilizer of butyrolactone in an amount of 10.0 weight percent of the solution in the negative compartment. A chemical analysis of the above non-ionic surfactant additive disclosed the following percentages of carbon, hydrogen, nitrogen, sulfur and fluorine: 39.67% carbon, 5.63% hydrogen, 0.50% nitrogen, 1.70% sulfur, and 36.56% fluorine. The positive compartment was filled with an aqueous electrolytic solution containing 58/.0% H$_2$O, 14.0% ZnBr$_2$, 14.0% KBr, 14.0% CaCl$_2$ to which 10.0% bromine by weight was added. No additive or solubilizer was added to the positive compartment. This cell was made in accordance with my invention.

EXAMPLE X

The resistance of a zinc-bromine cell of the type of Example IX was recorded from the time of filling the cell with electrolyte, the negative compartment containing an aqueous electrolytic solution of the type of Example I. The cell resistance is mostly determined by the membrane resistance and was measured by employing a simple alternating current technique using a 1 KHz a.c. signal. The result is shown as line 1 in the graph of FIG. 2. For comparison, lines 2, 3, and 4 of the graph show the cell resistance as a function of time for three other cells. Line 2 was a standard cell which was obtained if the electrolyte in the negative compartment contained only 58.0% H$_2$O, 14.0% ZnBr$_2$, 14.0% KBr and 14.0% CaCl$_2$, but no surfactant additive and no organic solubilizer. Line 3 was obtained if 1.0% of the non-ionic surfactant additive having the formula:

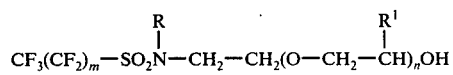

where $m$ is a number from 3 to 15, R is an alkyl radical having from 1 to 10 carbon atoms, R$^1$ is a member of a group consisting of hydrogen and methyl radical, $n$ is a number for the group from 0 to 30, and the surfactant additive has a molecular weight range of approximately 550 – 1500, was added to the above standard cell. Line 3 was obtained if 0.3% of the non-ionic surfactant additive and 0.5% of a commercial solubilizer were added to the above commercial cell. The commercial solubilizer was manufactured by the 3M Company, St. Paul, Minnesota and has the 3M Company designation L4048. It was added in a quantity following the suggestions of the manufacturer. The results in the graph of FIG. 2 show that addition of 1.0% surfatant additive to the standard cell lead to an undesirable increase in cell resistance by almost a factor three. This increase is caused by the formation of a resistive film on the membrane surface. The addition of the above commercial solubilizer to the standard electrolyte and surfactant additive is beneficial, but the resistance is still twice that of the standard cell. However, use of the electrolyric solution of the type of Example I, in accordance with my invention, results in a cell resistance that is, in fact, slightly lower than that corresponding to the standard cell. The solution of Example I not only prevents the formation of a resistive film on the cation exchange membrane but actually leads to a lowering of its resistance due to enhanced swelling of the membrane caused by the addition of the butyrolactone solubilizer. Such enhanced swelling of the membrane by compounds similar to butyrolactone is well-known in the art.

While other modifications of the invention and variations thereof which may be employed within the scope of this invention have not been described, the invention is intended to include such as may be embraced within the following claims:

What I claim as new and desire to secure by Letters Patent of the United States is:

1. A dendrite-inhibiting elecrtrolytic solution comprising a solution containing a zinc compound, from 0.001 to 10 weight percent of a non-ionic surfactant additive having the formula:

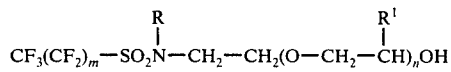

where $m$ is a number from 3 to 15, R is an alkyl radical having from 1 to 10 carbon atoms, R$^1$ is a member of a group consisting of hydrogen and methyl radical, $n$ is a number for the group from 0 to 30, and the surfactant additive has a molecular weight range of approximately 550 – 1500, and an organic solubilizer in an amount from 5 to 50 weight percent of the solution.

2. A dendrite-inhibiting electrolytic solution as in claim 1, in which there is present one percent by weight of the non-ionic surfactant additive.

3. A dendrite-inhibiting electrolytic solution as in claim 1, in which there is present one-tenth percent by weight of the non-ionic surfactant additive.

4. A dendrite-inhibiting electrolytic solution as in claim 1, in which there is present one percent by weight of the non-ionic surfactant additive, and 25 percent by weight of an organic solvent complex solubilizer of butyrolactone.

5. A dendrite-inhibiting electrolytic solution as in claim 1, in which there is present 0.1 percent by weight of the non-ionic surfactant additive, and 5 percent by weight of an organic solvent complex solubilizer of dimethylsulfonamide.

6. A rechargeable aqueous zinc-halogen cell comprising a casing, a pair of spaced apart porous electrode substrates in the casing, an ion exchange membrane between the electrode substrates defining a positive and a negative electrode compartment, an electrolytic solution containing a zinc compound in both compartments, from 0.001 to 10 weight of the solution of a non-ionic surfactant additive in the negative compartment, the non-ionic surfactant additive having the formula:

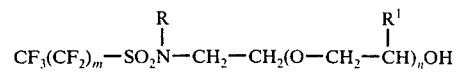

where $m$ is a number from 3 to 15, R is an alkyl radical having from 1 to 10 carbon atoms, R$^1$ is a member of a group consisting of hydrogen and methyl radical, $n$ is a number for the group from 0 to 30, and the surfactant additive has a molecular weight range of approximately 550 – 1500, and an organic solubilizer in an amount from 5 to 50 weight percent of the solution in the negative compartment.

7. A rechargeable aqueous zinc-halogen cell as in claim 6, in which there is present 1 percent by weight of the non-ionic surfactant additive.

8. A rechargeable aqueous zinc-halogen cell as in claim 6, in which there is present one-tenth percent by weight of the non-ionic surfactant additive.

9. A rechargeable aqueous zinc-halogen cell as in claim 6, in which there is present 1 percent by weight of the non-ionic surfactant additive, and 25 percent by weight of an organic solvent complex solubilizer of butyrolactone.

10. A rechargeable aqueous zinc-halogen cell as in claim 6, in which there is present 0.1 percent by weight of the non-ionic surfactant additive, and 5 percent by weight of an organic solvent complex solubilizer of dimethylsulfonamide.

* * * * *